Jan. 2, 1934.                P. J. MUSCHONG                1,941,994
                               GEAR PINION
                    Original Filed Aug. 1, 1931    2 Sheets-Sheet 1
Fig. 1.
Fig. 5.
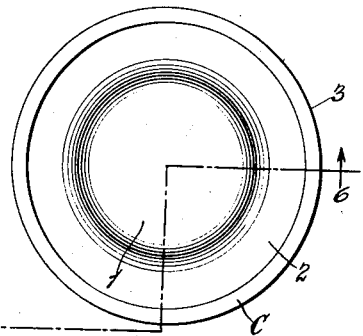
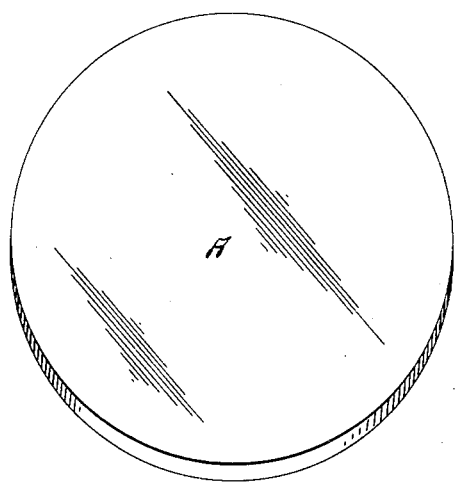
Fig. 6.
Fig. 2.
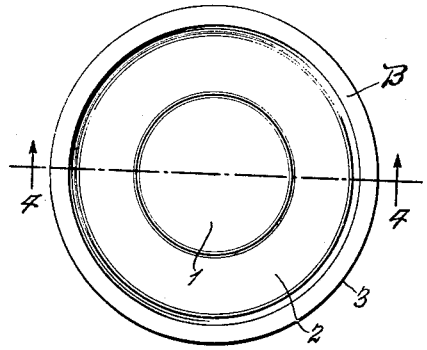
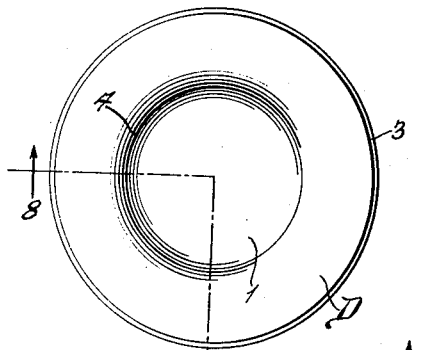
Fig. 7.
Fig. 3.
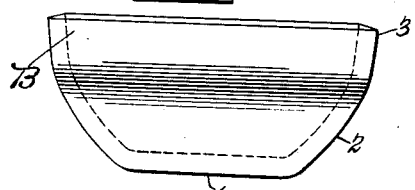
Fig. 8.
Fig. 4.
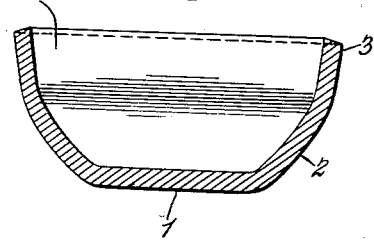
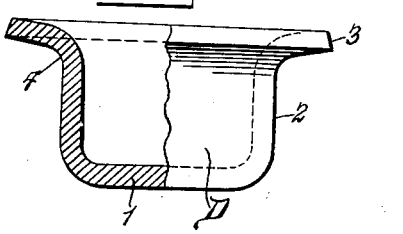
Inventor
Peter J. Muschong
by Rippey & Kingsland
His Attorneys Jan. 2, 1934.         P. J. MUSCHONG         1,941,994
                         GEAR PINION
              Original Filed Aug. 1, 1931   2 Sheets-Sheet 2

Inventor
Peter J. Muschong
by Rippey & Kingsland
His Attorneys.

Patented Jan. 2, 1934

1,941,994

UNITED STATES PATENT OFFICE 1,941,994

GEAR PINION

Peter J. Muschong, St. Louis, Mo., assignor to Metallic Sash-Operator Company, a corporation of Missouri Application August 1, 1931, Serial No. 554,427
Renewed November 1, 1933

3 Claims. (Cl. 74—28)

This invention relates to a new and useful gear pinion and the method of making the same.

An object of the invention is to produce a gear pinion comprising a hub section, a web and a gear face, said pinion being made in two sections, and the sections being made from deformed flat blanks, whereby a strong gear element, accurately formed, may be manufactured economically.

Another object of the invention is to provide a method for producing a gear pinion of the general characteristics above set forth.

The specific features of the invention will be readily apparent from the following detailed description thereof, taken in connection with the accompanying drawings, in which—

Fig. 1 illustrates a blank from which one-half of the pinion is formed.

Fig. 2 is a plan view of the first deformation of the blank.

Fig. 3 is a side elevation of the form assumed by the blank after the first operation.

Fig. 4 is a sectional view on the line 4—4 of Fig. 2.

Fig. 5 is a plan view of the form assumed by the blank after the second operation.

Fig. 6 is a sectional view on the line 6—6 of Fig. 5.

Fig. 7 illustrates the form assumed by the blank after the third operation.

Fig. 8 is a sectional view on the line 8—8 of Fig. 7.

Figure 9:
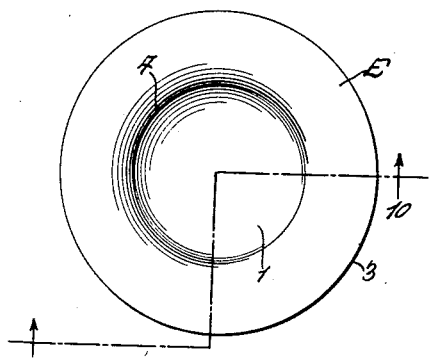
Fig. 9 illustrates the form assumed by the blank after the next operation.

In the embodiment of the invention illustrated in the drawings, the gear is shown as including two duplicate parts, each part being made from a circular blank of sheet metal, capable of being die-drawn. This blank may be of any desired diameter and thickness. It is illustrated in Fig. 1 and indicated by the letter A. The blank is then mounted in a drawing die of a construction whereby the blank is deformed first to produce a cup-like structure, particularly illustrated in Figs. 3 and 4. The cup-like structure is relatively shallow in depth and the margins of the cup-like structure are formed without angularity. The first deformation of the blank may be conveniently accomplished by a plunger pressure within satisfactory manufacturing limits.

It will be noted that in this first deformation of the blank, there is a substantially horizontal bottom wall 1, concave side walls 2 and a substantially vertical marginal edge 3. For the purpose of clearness of description, the first deformation of the blank may be indicated by B.

Figure 10:
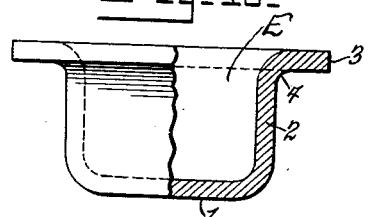
Fig. 10 is a sectional view on the line 10—10 of Fig. 9.

The deformed blank B is then mounted in a second drawing die having a cooperating pressure member that deforms the blank B to produce the deepened cup structure C in which the side walls 2 are extended downwardly and the margin 3 is given an outward flare, as indicated particularly in Fig. 6. The blank C is then mounted in a forming die and, by an appropriate pressure means, is deformed to provide the blank D, in which the side walls 2 are given substantially a vertical set and the margin 3 is turned outwardly to form a flange which is connected to the vertical walls 2 by a curved wall 4. The blank D is then subjected to a forming action in another forming die which resets the wall 4 so that a flange extending at right angles to the vertical wall 2 is provided, and provides the structure particularly illustrated in Figs. 9 and 10, and indicated by E.

The blank, when it assumes the shape as indicated by E, includes the cylindrical wall section to form one-half of the hub of the gear. The flange extends in a plane substantially normal to the hub section, so that the periphery of the flange is coaxial with the hub. The curved lower section of the side wall forms a bevel at the outer end of the hub. The side walls are of uniform thickness and are accurately formed.

Figure 11:
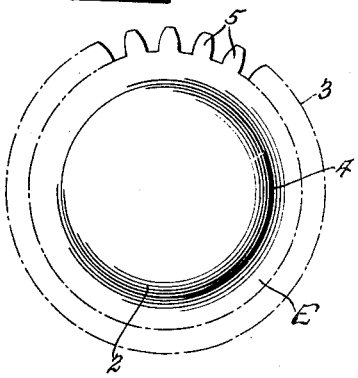
Fig. 11 illustrates the form assumed by the blank after the next operation.

The gear teeth 5 are next formed in the flange by a cutting die to provide the structure shown particularly in Fig. 11. Since the blank still has the flange 3 supported by a dome-shaped or curved lower wall, the flange will be held rigidly in position to receive the die whereby the gear teeth are accurately cut therein and the blank is prevented from becoming deformed during the cutting operation.

Figure 12:
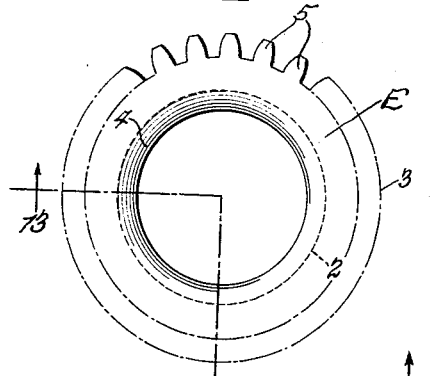
Fig. 12 illustrates the form assumed by the blank after the next operation.
Figure 13:
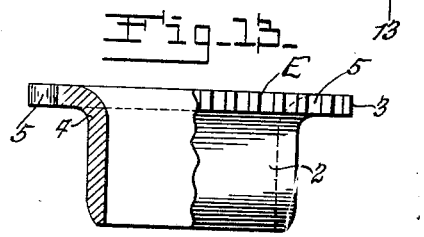
Fig. 13 is a sectional view on the line 13—13 of Fig. 12.

After the teeth have been cut in the flange, the blank E is subjected to a cutting die action, which cuts out the bottom wall and provides the structure shown particularly in Figs. 12 and 13.

Figure 14:
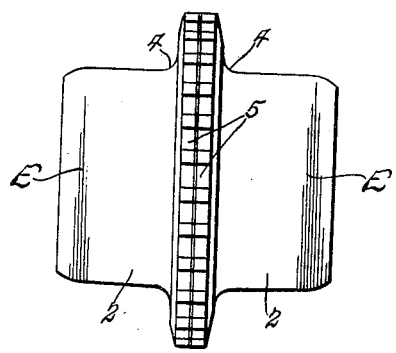
Fig. 14 illustrates the assembly of the two parts of the gear.
Figure 15:
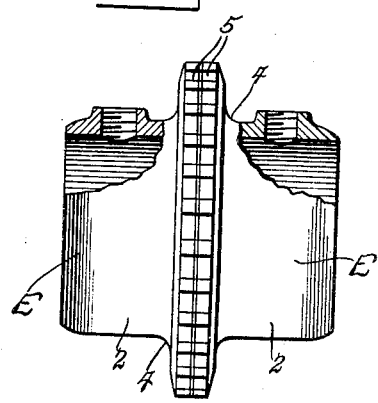
Fig. 15 illustrates the completed gear.

Two of the completed blanks are then matched with the faces of the flanges against each other and may be held rigidly together by spot welding or by other suitable means for effecting the joinder between the two, producing the structure shown in Fig. 14. Thereafter, by a punching operation, screw bosses are formed in each of the hub sections, which bosses may be threaded to form the structure shown particularly in Fig. 15.

Since the gear is made up of exactly duplicate sections, the teeth may be accurately matched to form a relatively wide gear face formed on a central web section which is integral with the hub sections of the gear. The completed gear wheel has an axis accurately concentric with the axis of the hub so that, when the hub is positioned on a shaft, the finished gear will operate on a concentric axis.

The completed structure is extremely strong and relatively light, and may be made by quantity production at an extremely low manufacturing cost.

While I have recited a particular sequence of steps, it will, of course, be recognized that the sequence may be varied and that other modifications within the limits of the invention may be made.

What I claim and desire to secure by Letters Patent is:—

1. A gear composed of drawn and formed sheet metal and comprising duplicate sections, each section including a radial annular web portion having peripheral teeth punched in its periphery cut laterally to the plane of the sheet, and an integral laterally extending hub portion, said web portions being joined face to face with the teeth in abutting position and in lateral alinement.

2. A gear formed from a flat metal blank and comprising duplicate formed sections, each section including an annular web portion having peripheral teeth therein cut laterally to the plane of the sheet, and an integrally formed laterally extended cylindrical portion coaxial with the teeth, and the sections being joined together with the faces of the web portions abutting against each other and with the peripheral teeth thereon in abutting position and extending in lateral alinement.

3. A gear formed from a flat metal blank and comprising duplicate formed sections, each section including an annular web portion and an integrally formed laterally extended cylindrical portion, the peripheral part of said web portion lying in a plane perpendicular to said cylindrical portion and having teeth cut in its edge, the said sections being joined together with the faces of the web portions abutting each other at their periphery and with the teeth thereon extending in lateral alignment.

PETER J. MUSCHONG.